United States Patent [19]
Azuma et al.

[11] 3,776,778
[45] Dec. 4, 1973

[54] COLLECTIVE DRY CELL UNIT

[75] Inventors: Kuninori Azuma, Ikoma; Miyoji Nakai, Neyagawa, both of Japan

[73] Assignee: Matsushita Electric Industry Co., Ltd., Osaka, Japan

[22] Filed: Jan. 31, 1972

[21] Appl. No.: 222,022

[30] Foreign Application Priority Data
Feb. 3, 1971 Japan.................................. 46/5408
Feb. 3, 1971 Japan.................................. 46/5409

[52] U.S. Cl. .............. 136/132, 136/134 P, 136/173
[51] Int. Cl. ............................................. H01m 5/00
[58] Field of Search.................... 136/132, 173, 175, 136/134

[56] References Cited
UNITED STATES PATENTS
| | | | |
|---|---|---|---|
| 3,553,033 | 8/1968 | Page .................................. | 136/132 |
| 3,056,850 | 10/1962 | Rauske et al. ...................... | 136/173 |
| 880,703 | 3/1908 | Wheeler et al. ..................... | 136/132 |
| 3,440,105 | 4/1969 | Yamamoto et al. ................. | 136/175 |

FOREIGN PATENTS OR APPLICATIONS
| | | | |
|---|---|---|---|
| 377,925 | 6/1923 | Germany ............................ | 136/173 |
| 187,722 | 10/1922 | Great Britain ...................... | 136/173 |
| 785,179 | 8/1935 | France ................................ | 136/132 |

*Primary Examiner*—Donald L. Walton
*Attorney*—Richard K. Stevens et al.

[57] ABSTRACT

A collective dry cell unit comprising a plurality of dry cells arranged in parallel positions, connecting leads for connecting the terminals of different polarities of adjacent cells, a plurality of take-out leads each having an end connected to the terminal of the dry cell positioned at the extreme right or left and the other end extended outward, a pair of fixing plates of insulating material and a housing for containing the dry cells; characterized in that each of the leads is fixed on the fixing plates and the pair of fixing plates is connected with each other by at least one of the leads, whereby the fixing plates are pressed inwardly thereby to maintain each lead in contact with the terminal of a dry cell.

6 Claims, 8 Drawing Figures

COLLECTIVE DRY CELL UNIT

This invention relates to a collective dry cell unit in which a plurality of dry cells are arranged in parallel physical positions as a unit while connecting them electrically in series or parallel, or more in particular a collective dry cell unit in which three dry cells of 1.5 volts each are positioned physically in parallel and connected in series to obtain the voltage of 6 volts from the terminals for connection with external equipment such as tape recorders and radio sets.

Electrical appliances such as tape recorders and radio sets require ordinarily a power supply of 6 or 9 volts. When dry cells are employed as the power supply, a plurality of them are needed to produce such a voltage. If these dry cells must be handled separately, they are inconvenient since it is troublesome to replace them. To overcome this difficulty, what is called a collective dry cell unit was developed in which a plurality of dry cells are arranged longitudinally or laterally side by side and are electrically connected in series to form a unit.

There is no special problem when a plurality of dry cells are arranged in a longitudinal direction since in such a case the dry cells are connected in series as a matter of course. However, if a plurality of dry cells are to be arranged in parallel side by side, it is necessary to connect them with leads, and the workability or efficiency of assemblage and the accuracy of connection in a collective dry cell unit depends on the manner in which leads are connected to each cell. This consideration is especially important in view of the fact that many electrical appliances such as tape recorders require the use of a collective dry cell unit with the component dry cells arranged side by side.

In conventional collective dry cell units of this type, leads are connected between positive and negative terminals of different dry cells arranged side by side and also between the end terminals of the collective dry cell unit and take-out terminals by soldering their joints. The disadvantages of these units are the complication of the assemblage work of the dry cell units due to the soldering process, low workability and high cost.

Accordingly, it is an object of the present invention to provide a collective dry cell unit in which dry cells are connected easily with one another thereby to facilitate assemblage and improve the production efficiency.

Another object of the invention is to provide a collective dry cell unit in which there is no fear of the dry cells being disconnected by the vibration of the unit, securing the connection between them.

For the purpose of attaining the above-described objects, the collective dry cell unit according to the invention comprises a plurality of dry cells arranged side by side, connection leads for connecting the positive and negative terminals of adjacent dry cells, a pair of take-out leads connected with the end terminals of the dry cell unit for further connection with external equipment, a pair of fixing plates of insulating material disposed in the two planes respectively on those sides of the dry cell unit which contain the poles of the dry cells, and a housing containing the dry cells; characterized in that the portions of the leads which are to be brought into contact with the terminals of the dry cells are fixed on the fixing plates which are in turn connected by at least one connecting lead, so that the fixing plates are pressed inwardly thereby to maintain the contact portions of the leads in contact with the dry cell terminals.

The above and other objects, features and advantages will be made apparent by the detailed description taken in conjunction with the accompanying drawings, in which.

Figure 1:
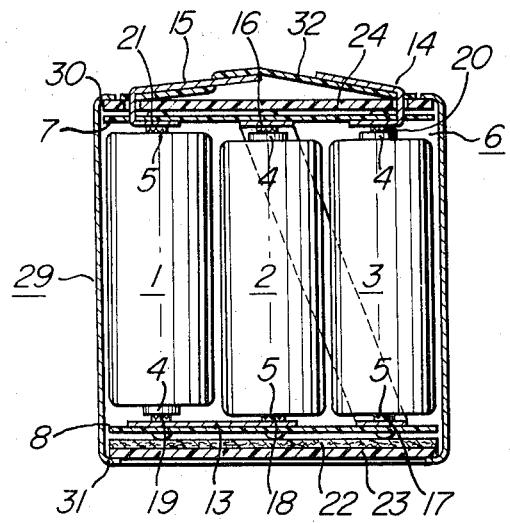
FIG. 1 is a diagram showing a side view of an embodiment of the present invention.
Figure 2:
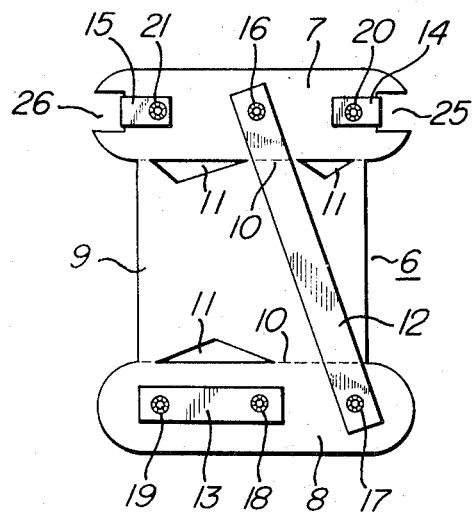
FIG. 2 shows a front view of the lead fixing plates thereof.

In the following description and explanation of the invention, the words "upper" and "lower" or "top" and "bottom" will be referred to with respect to the direction in which the device of the invention is arranged in the accompanying drawings. The directional relation, however, may be different in actual use depending on the conditions in which it is operated with an external load. Explanation will be made first of the embodiment as shown in FIGS. 1 to 5. In the drawings, the reference numerals 1, 2 and 3 show dry cells each consisting of an ordinary cylinder-type manganese dry cell without any closure. Such a dry cell comprises a paste layer including an electrolyte attached to the inner surface of a cylindrical negative zinc can for the cell, a positive mixture consisting of manganese dioxide filled in the center of the zinc can, a separator interposed between the paste layer and the positive mixture, a carbon collector rod inserted in the center of the positive mixture, and an insulator placed on the bottom of the zinc can. The opening on the top of the zinc can is fitted with a seal plate, which is in turn covered with a sealing material such as pitch thereby sealing the opening. The upper end of the collector rod which is extended outward from the sealed opening is fitted with a positive cap, while the peripheral surface from the upper to lower ends of the zinc can is covered with a tube of thermally contractive resin. The positive cap acts as a positive terminal and the bottom of the zinc can as a negative terminal 5. Among the three dry cells 1, 2 and 3 arranged side by side, the cells 2 and 3 have their positive terminals 4 up, whereas the dry cell 1 is disposed with its positive terminal 4 down. The reference numeral 6 shows a lead fixing frame of insulating material for sandwiching and supporting the dry cells which consists of, for example, a sheet of polyvinyl chloride 0.3 mm thick. The lead fixing frame 6 includes an upper lead fixing plate 7 adapted for contact with the upper sides of the dry cells, a lower lead fixing plate 8 adapted for contact with the bottom surfaces thereof and a connecting plate 9 for connecting the fixing plates 7 and 8, the fixing frame 6 being adapted to be bent along the dotted lines 10. It is essential that the lead fixing frame 6 is provided with the property of electrical insulation and preferably made of electrically insulated paper water-proofed with wax or pitch or synthetic resin such as polyvinyl chloride polyethylene, and polyproprene. Also, it is recommended to form the lead fixing frame 6 by punching. Further, in order to facilitate the bending of the lead fixing plates 7 and 8, a plurality of apertures 11 are provided along the dotted lines 10. Numerals 12 and 13 show lead plates made of tin 0.12 mm thick for connecting in series the terminals of different polarities of the dry cells 1, 2 and 3, and numerals 14 and 15 take-out lead plates attached to the terminals 4 and 5 of different polarities at the extreme ends of the dry cells connected in series. The take-out lead plates 14 and 15 consist of brass 0.3 mm thick and strong enough to permit connection with external equipment. The lead plate 12 is provided for connection between the terminals 4 and 5 of different polarities of the dry cells 2 and 3, and the lead plate 13 for connection between the terminals 4 and 5 of diferent plarities of the dry cells 1 and 2. The lead plate 14 is connected with the positive terminal 4 of the dry cell 3, while the lead plate 15 with the negative terminal 5 of the dry cell 1. The portions of the lead plates 12, 13, 14 and 15 to be contacted with the cell terminals 4 or 5 are fixed on the lead fixing plate 7 or 8 with the rivets 16, 17, 18, 19, 20 and 21 respectively, so that the rivets are brought into contact with the terminals of the dry cells. The reference numeral 22 shows insulating buffer paper disposed on the under side of the lower lead fixing plate 8 and which consists of a sheet of cardboard 1.5 mm thick and coated with polyethylene. Numeral 23 shows a lower insulating seal disposed on the under side of the buffer paper 22 and which consists of a sheet of hard polyvinyl chloride 1.5 mm thick. Numeral 24 shows an upper insulating seal arranged on the upper side of the upper lead fixing plate 7, which like the lower seal 23 consists of a sheet of hard polyvinyl chloride 1.5 mm in thickness. The take-out lead plates 14 and 15 are extended outwards through the apertures 25 and 26 provided on the ends of the lead fixing plate 7 and through lead apertures 27 and 28 formed on the ends of the upper seal 24. The portions of the take-out lead plates 14 and 15 which are extended outwards are bent inwardly to form positive and negative terminals respectively for connection with external equipment. The reference numeral 29 shows a cylinder-like metal jacket of iron or the like which contains the dry cells together with the lead fixing frame 6. The ends 30 and 31 of the metal jacket 29 are curled inwardly to fasten the seals 23 and 24 thereby fixing the dry cells inside. By means of the force applied when the ends 30 and 31 of the metal jacket 29 are curled inwardly, the rivets 16, 17, 18, 19, 20 and 21 of the lead plates 12, 13, 14 and 15 are maintained pressed against the terminals 4 and 5 of the dry cells. Numeral 32 shows an insulating sheet disposed on the upper side of the upper seal 24 and which consists of a polyethylene sheet 0.2 mm thick. This insulating sheet 32 is provided with end slots 33 and 34 through which the take-out lead plates 14 and 15 are adapted to be led out, and also with an engaging slot 35 in the vicinity of its center through which the end of the lead plate 15 on the negative side is adapted to pass downwards. The outside end of the lead plate 14 adapted for a positive terminal is extended outwards through the slot 33 of the insulating sheet 32. Also, the lead plate 15 on the negative side is longer than the lead plate 14 on the positive side, so that the outer end of the lead plate 15 which is adapted to be a negative terminal is extended outwards through the take-out slot 34 of the insulating sheet 32, with the extreme end thereof being extended downward under the insulating sheet 32 through the engaging slot 35.

Figure 3:
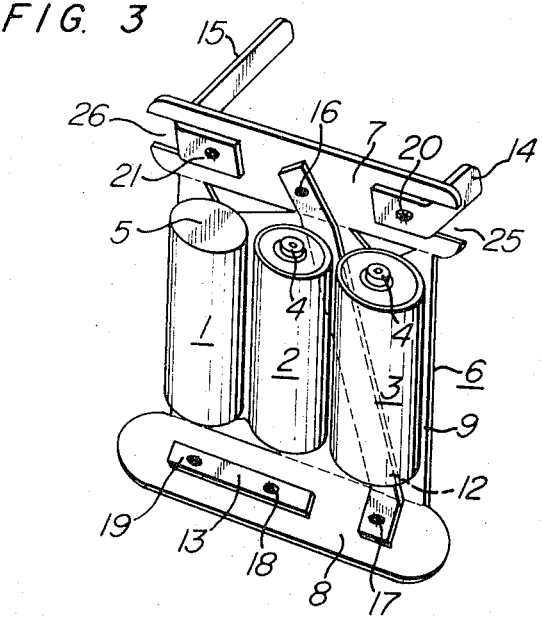
FIG. 3 is a diagram showing the relation between the lead fixing plates and dry cells.
Figure 4:
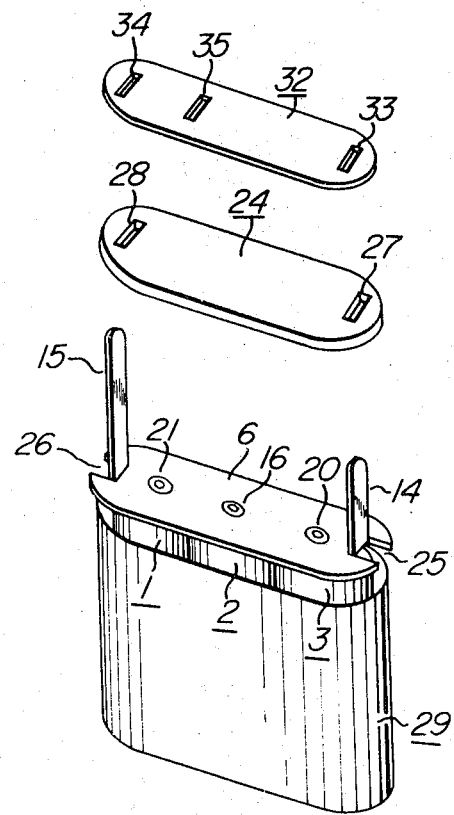
FIG. 4 is a perspective view showing the dry cell unit as dry cells, together with the lead fixing plates, are being inserted into the jacket.
Figure 5:
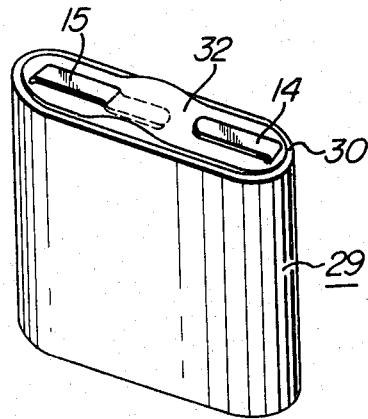
FIG. 5 is a diagram showing a perspective view of the outside of the collective dry cell unit according to the invention in its complete form.

In assembling the collective dry cell unit with the above described construction, the dry cells 2 and 3 with their positive terminals 4 up are aligned side by side with the dry cell 1 with its positive terminal 4 down. The dry cells 1, 2 and 3 are then disposed inside the fixing frame 6, as shown in FIG. 3, on which are fixed the lead plates 12, 13, 14 and 15, bringing the rivets into contact with corresponding dry cell terminals respectively. After that, the lower peripheral portion 31 of the metal jacket 29 is curled inwardly and the bottom aperture thereof is sealed with the seal plate 23 and buffer paper 22. As shown in FIG. 4, the dry cells 1, 2 and 3 are inserted into the metal jacket 29, together with the fixing frame 6. The take-out leads 14 and 15 are passed through the take-out slots 27 and 28 of the upper seal 24 outwardly of the upper seal 24, whereby the top aperture of the metal jacket 29 is closed. The upper peripheral portion 30 of the metal jacket 29 is then curled inwardly, thereby pressing the seal plates 23 and 24 inwardly to fix the dry cells. The take-out lead plates 14 and 15 are bent inwardly, while attaching the insulating sheet 32 to the lead plate 15.

As can be seen from the above description, this embodiment eliminates the need for soldering operation in coupling the lead plates and dry cell terminals with each other. Instead, the force applied when the upper and lower ends of the metal jacket 29 are bent is used advantageously to connect the lead plates and the dry cell terminals by pressing the rivets of the lead plates against the dry cell terminals, resulting in a much easier and improved productivity with which the collective dry cell units are capable of being assembled.

Furthermore, since a part of the rivets engages with the dry cell terminals as they are pressed against the dry cell terminals, there is no likelihood of their being disconnected from each other due to vibrations and other external causes, thus securing the connection. In addition, the lead plates are fixed on the fixing frame 6 as a unit, facilitating the assembly work. A still another advantage of the invention, the fact that the lead plates are fixed on the fixing frame 6 with rivets makes the lead plates stable on the frame 6. There is no need to provide protrusions on the lead plates for easier contact with the dry cell terminals, since the rivets are brought into contact with the dry cell terminals readily. The fixing frame 6 of insulating material assures improved insulation between the dry cells 1, 2 and 3 and the metal jacket 29. Since the upper and lower fixing plates 7 and 8 are connected with each other by the connecting plate 9 so that the fixing plates are capable of being bent, no disorder or distortion results between the fixing plates 7 and 8, thereby improving the workability in assembling the collective dry cell units. Also, since the connecting plate 9 acts as an insulator between the metal housing 29 and the lead plate 12, there is no special need for a process to give the insulating ability to the lead plate 12. Moreover, the outside ends of the take-out lead plates 14 and 15 function also as terminals for external connection and therefore there is no need of provision of an independent terminal for connection with an external load, resulting in a lower production cost. Still another advantage of the invention is that the force applied at the time of bending the upper and lower ends of the metal jacket 29 helps the seal of synthetic resin to be brought into close contact with the aperture of the zinc can, making the solution in each dry cell less liable to be leaked.

Tests have been conducted on the resistance of the collective dry cell unit with above-described construction to vibrations, shock and leakages, of which the results are illustrated below.

1. Vibration test

The collective dry cell unit according to the present invention was subjected to the longitudinal, lateral and vertical vibrations each for 90 minutes with the amplitude of 2 mm and frequency of 1 to 3,000 per minute. Then the collective dry cell unit was checked for contact between each lead plate and a corresponding terminal of the dry cell. As a result, every terminal was found in good contact with the mating lead plate.

2. Drop test

The collective dry cell unit according to the invention packaged in a carton box was dropped from the height of 1.5 m three times with one side, one face and one corner thereof down respectively. Similar tests were conducted on an unpackaged collective dry cell unit from the height of 0.5 m. In both cases, no abnormalities were found in the dry cells in the unit after the tests.

3. Leakage resistance test

The collective dry cell unit according to the invention was discharged with a load of 225 ohm (75 ohm per cell) connected thereto at the temperature of 35°C and the humidity of 90 percent, and after 2 months it was checked for leakage of the solution. But no leakage was found from it.

Figure 6:
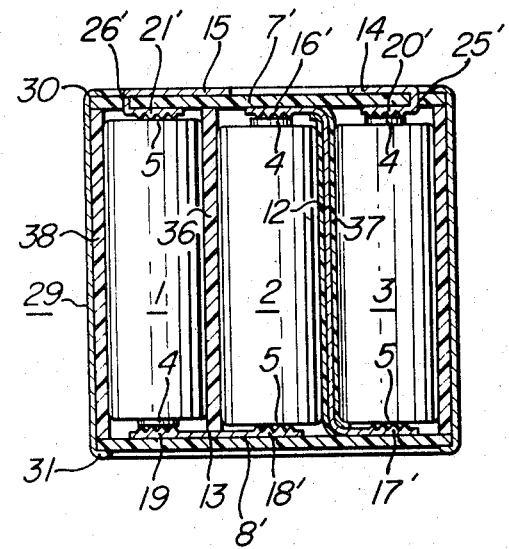
FIG. 6 is a diagram showing a sectional view of another embodiment of the present invention.
Figure 7:
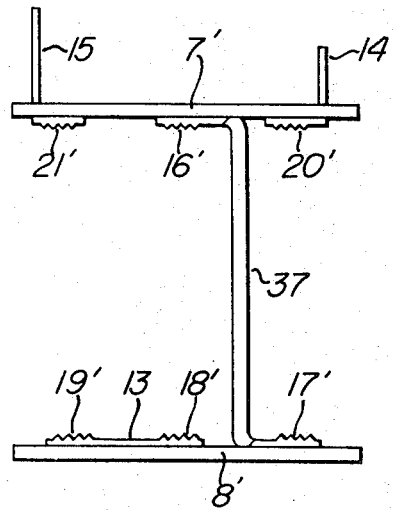
FIG. 7 is a diagram showing a side view of the lead fixing plates employed in the embodiment of FIG. 6.

Still another embodiment of the invention will be now explained with reference to FIGS. 6 and 7. In the drawings, the same numerals denote those component elements which have the same functions and constructions as the like component elements in FIGS. 1 to 5, while those component elements which have slightly different functions and constructions are marked with the primes of the same numerals.

The reference numerals 1, 2 and 3 show dry cells which are not covered with any resin tubes on their sides but are provided with an insulating partition 36 between the dry cells 1 and 2 to prevent short-circuiting. The numerals 7' and 8' show lead fixing plates which are separated from each other. The numerals 12 and 13 show connecting lead plates. The portion of the lead plate 12 which is interposed between the dry cells 2 and 3 constitutes an insulating film 37 for prevention of short-circuiting. The numerals 14 and 15 show take-out leads each of which has an outside end thereof extended outwardly through a corresponding one of the take-out slots 25' and 26' of the fixing plate 7' and bent along the fixing plate 7' to form a terminal for external connection. The end portion of each lead plate which is adapted for contact with the terminal of the dry cell is fixed on the lead fixing plate 7' by means of a bonding agent. Numerals 16' to 21' show saw-toothed protrusions provided on the end portions of the lead plates. Numeral 38 shows resin cylinders covering the peripheral portions of the dry cells and numeral 29 a cylinder-shaped metal jacket.

In this embodiment, as in other embodiments, the force applied when bending the upper and lower ends 30 and 31 of the metal jacket 29 causes the protrusions on the lead plates to be pressed against the terminals of the dry cells, accomplishing very easily and accurately the connection between the lead plates and the terminals of the dry cells. Also, the fact that the lead plates are fixed on the fixing plates 7' and 8', in combination with the fact that the fixing plates 7' and 8' are connected by the lead plates 12, contributes greatly to the convenience with which the collective dry cell units are assembled.

Figure 8:
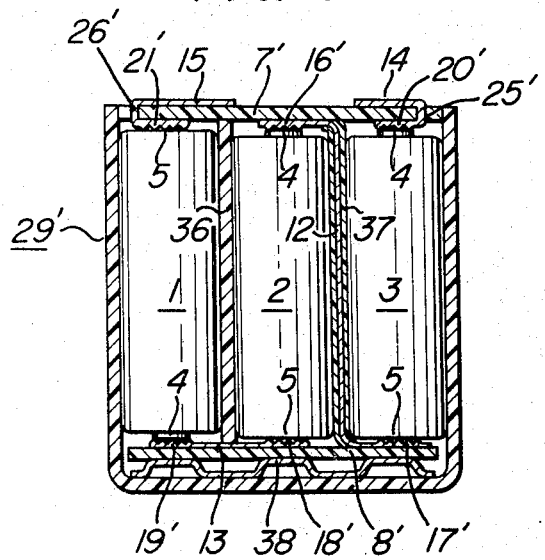
FIG. 8 is a sectional view of still another embodiment of the invention.

Explanation will be made now of the embodiment shown in FIG. 8. The numerals 1, 2 and 3 show dry cells, which, like those employed in the embodiment of FIGS. 6 and 7, are not covered with any resin tubes on their sides, but they are provided with an insulating partition 36 between the dry cells to prevent a short-circuiting. The numerals 7' and 8' show lead fixing plates which are independent of each other. The numerals 12 and 13 show connecting lead plates, the connecting lead plate 12 being interposed between the dry cells 2 and 3 together with an insulating film 37 attached thereto to prevent short-circuiting. The numerals 14 and 15 show take-out leads with their outside ends being extended outwardly through the take-out slots 25' and 26' of the fixing plate 7' and bent along the same to form terminals for external connection. The end portion of each lead plate which is adapted for contact with the terminal of a dry cell is fixed on the lead fixing plate by means of a bonding agent, the end portions being provided with saw-toothed protrusions 16' to 21'. The numeral 38 shows a corrugated spring plate disposed on the under side of the lower fixing plate 8' for applying force to the lead fixing plate 8' in the upper direction. The numeral 29' shows a cylinder-shaped bottomed housing of synthetic resin, with the lead fixing plate 7' being fixed on its top aperture by soldering or other appropriate means.

In this embodiment, the restitution of the spring plate 38 within the metal jacket 29' causes the fixing plate 8' and other components thereon to be pushed upward, whereby the protrusions on the lead plates are pressed into contact with the terminals of the dry cells, making it possible to easily and accurately connect the lead plates with the dry cell terminals. Also, since the lead plates are fixed on the fixing plates 7' and 8' which are in turn coupled with each other by the lead plate 12 to form an independent unit, greater convenience is achieved for assembly work.

It is understood that alterations and modifications of the detail of the construction of the above-mentioned embodiments are included in the scope of the claims described later in this specification.

It is apparent from the above description that according to the present invention the lead plates are connected with the dry cell terminals without using any soldering process but by pressing the contact portions of the lead plates against the dry cell terminals, facilitating and improving the accuracy and productivity of assembly of collective dry cell units. Further, since the lead plates are fixed on a pair of fixing plates of insulating material, with the fixing plates being connected by at least one lead plate, the lead plates and fixing plates make up one unit for combination with dry cells, thus facilitating the assembly work.

What we claim is:

1. A collective dry cell unit comprising a plurality of unit cells 1, 2, 3 aligned side by side; an insulating lead fixing frame 6 which has a sufficient mechanical strength for holding the unit cells and including two lead fixing plates 7, 8 contacting respective opposite sides of said plurality of unit cells in which their terminals are positioned and a connecting plate 9 for connecting said lead fixing plates, said lead fixing plates and connecting plate being integrally formed through bending lines 10, 10; connecting lead plates 12, 13 having at their both ends contact portions 16, 17, 18, 19 fixed to said lead fixing plates for connecting adjacent unit cells between their electrode terminals of opposite polarity, said plurality of unit cells being connected in series with each other through said connecting lead plates; take-out lead plates 14, 15 having at their one end contact portions 20, 21 fixed to said lead fixing plates and connected with the terminals of the end ones of said plurality of unit cells, said take-out lead plates having at their respective other ends external connecting portions; and a jacket 29 housing said lead fixing frame with said lead plates and said plurality of unit cells such that said lead fixing plates of said lead fixing frame are inwardly pressed so that each of said lead plates is partly in contact with the terminals of said plurality of unit cells.

2. A collective dry cell unit according to claim 1, in which said jacket is made of a metal cylinder, and the top and bottom peripheral portions of said jacket are curled inwardly whereby said pair of fixing plates is pressed inwardly thereby to bring the contact portions of the leads into contact with the terminals of said dry cells.

3. A collective dry cell unit according to claim 1, in which each of said leads consists of a thin metal plate, said lead plate being fixed on said fixing plate with a rivet, said rivet being pressed against a terminal of a dry cell.

4. A collective dry cell unit according to claim 1, wherein one of said lead plates is fixed to one of said lead fixing plates and a second of said lead plates is connected at respective end portions to each of said two lead fixing plates, said second lead plate being bendable along the bending lines between said fixing plates and said connecting plate.

5. The collective dry cell unit according to claim 1, wherein said fixing plates and said connecting plate comprise a sheet composed of a material selected from the group consisting essentially of polyvinylchloride, polyethylene and polypropylene, said sheet being approximately 0.3 mm in thickness.

6. A collective dry cell unit comprising three cylinder-shaped dry cells aligned side by side, two out of said three dry cells being arranged in the same direction, the other thereof being arranged up side down, two connecting lead plates each with its ends pressed against the terminals of different polarities of dry cells which are adjacent to each other, a pair of take-out lead plates each with its one end pressed against the terminal of one of said dry cells which is situated at their extremity and the other end thereof extended outwardly to form a terminal for external connection, a fixing frame of insulating material including a pair of fixing plates for sandwiching said dry cells from the sides of said dry cells containing the terminals thereof, said fixing plates being bendably and integrally connected with each other by a connecting plate, said lead plates each having a portion adapted for being pressed against a terminal of said dry cell, said portion of said lead plate being fixed on said fixing frame with a rivet, and a housing made of a metal cylinder and having upper and lower ends curled inwardly thereby to press said rivet in each lead plate against a terminal of dry cell contained in said housing.

* * * * *